United States Patent [19]

Ogihara et al.

[11] 3,934,912
[45] Jan. 27, 1976

[54] VEHICLE ENERGY-ABSORBING SYSTEM WITH ADJUSTABLE ABSORPTION CAPACITY

[75] Inventors: Yoshiyuki Ogihara; Norimoto Aya, both of Yokosuka, Japan

[73] Assignee: Nissan Motor Company Limited, Yokohama, Japan

[22] Filed: July 19, 1974

[21] Appl. No.: 489,914

[30] Foreign Application Priority Data
July 23, 1973   Japan.............................. 48-80862

[52] U.S. Cl.............. 293/73; 180/100; 180/105 E; 267/22 A; 267/116; 293/1
[51] Int. Cl.².......................................... B60R 19/02
[58] Field of Search........... 293/1, 9, 10, 68, 70, 73, 293/85, 89; 180/82 R, 91, 98, 100, 103, 105 R, 105 E, 106, 108–110; 267/22 A, 116; 280/DIG. 1

[56] References Cited
UNITED STATES PATENTS

| | | | |
|---|---|---|---|
| 2,890,076 | 6/1959 | Baechler | 293/68 X |
| 3,051,507 | 8/1962 | Fiala | 280/DIG. 1 |
| 3,181,877 | 5/1965 | McHenry | 280/DIG. 1 |
| 3,324,287 | 6/1967 | Fetterman et al. | 180/100 X |
| 3,355,208 | 11/1967 | Brock | 293/73 X |
| 3,689,054 | 9/1972 | Gouirand | 293/68 |
| 3,789,948 | 2/1974 | Hrebicek | 180/91 |
| 3,848,914 | 11/1974 | Wathen | 180/82 R X |

FOREIGN PATENTS OR APPLICATIONS
1,093,233   11/1960   Germany.............................. 180/91

Primary Examiner—M. Henson Wood, Jr.
Assistant Examiner—Andres Kashnikow

[57] ABSTRACT

A system constituted of a retractable bumper coupled with a hydraulic shock absorber the shock absorption characteristic of which is governed by a pressurized gas, a weight sensor for sensing the vehicle gross weight, a pressure regulator for the pressurized gas, a carriage mechanism which supports the shock absorber and can move it in the longitudinal direction of the vehicle, and an electrical control unit for controlling both the pressure regulator and the carriage mechanism in response to the signal from the weight sensor, so that the energy absorption capacity of the system in a collision of the vehicle represented by the product of the resistance offered against a retracting movement of the bumper by the shock absorber and the distance travelled by the bumper until coming into contact with the vehicle body can be varied depending on the weight of the vehicle payload.

2 Claims, 7 Drawing Figures

VEHICLE ENERGY-ABSORBING SYSTEM WITH ADJUSTABLE ABSORPTION CAPACITY

The present invention generally relates to an impact-absorbing buffer device for a motor vehicle, and more particularly to a system for controlling the energy absorption capacity of the buffer device.

In a collision or a crash of a vehicle against an obstacle, the magnitude of the impact force, which depends on the momentum or kinetic energy of the vehicle, varies with the vehicle weight, or more accurately the gross vehicle weight, as well as with the vehicle speed. In some types of vehicles, for example in motor trucks and busses, the gross weight of the vehicle varies within a wide range between unladen and fully laden weights, and also the magnitude of kinetic energy or impact force in a collision varies similarly over a wide range.

Accordingly, it is necessary for such vehicles to regulate the energy absorption capacity of impactabsorbing devices such as front and rear bumpers thereof to most appropriate values in accordance with the variation in the magnitude of kinetic energy so that passengers may be protected against injury irrespective of the vehicle weights and/or speeds.

It is an object of the present invention to provide an energy-absorbing system for a vehicle, especially for an automobile, in which the energy-absorption capacity can be automatically controlled in accordance with variation in the vehicle gross weight and/or vehicle speed.

According to the invention, there is provided an energy-absorbing system for an automobile, comprising: a buffer device for receiving an impact force and for absorbing the impact energy in a crash of the vehicle against an obstacle, first means to sense the weight of a payload loaded on the vehicle and produce a first signal representing the sensed weight, and second means to cause the buffer device to vary the energy absorption capacity thereof in dependence on the first signal.

Preferably, such a system further comprises means to sense the vehicle speed and to produce a second signal representing the sensed speed, which signal is transmitted to the second means or independent means similar to it. The energy absorption capacity is regulated preferably by varying the stroke length of a movable bumper and/or the magnitude of the reaction force against the bumper movement.

The invention will be fully understood from the following detailed description taken with the accompanying drawings, in which.

Figure 1:
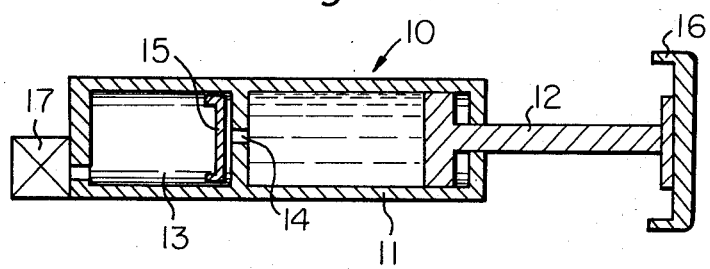
FIG. 1 is a sectional view of an automobile impact buffer device of a system of the invention.

Referring now to FIG. 1, a buffer device or impact-absorbing device 10 for use in a system of the invention essentially consists of a hydraulic cylinder 11, a combined piston-rod 12, a gas chamber 13 communicable with the cylinder 11 via an orifice 14 and a valve 15, and a bumper 16 attached to the external end of the piston-rod 12. The gas pressure in the chamber 13 is regulated by pressure regulator 17 so that the reaction force or resistance against an inward piston-rod 12 movement upon an impact on the bumper 16 may be predetermined to an optimum magnitude it will be understood that the device 10 excluding the bumper 16 is a hydraulic shock absorber.

Figure 2:
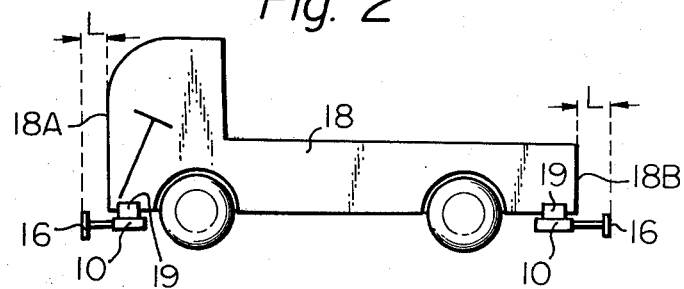
FIG. 2 is a schematic side view of a truck equipped with the buffer devices of FIG. 1.

In FIG. 2, a truck 18 is provided with the buffer devices 10 near to the front and rear ends thereof. Each device 10 is mounted on the frame (not shown) of the truck 18 with a carriage mechanism 19 in such an arrangement that the bumpers 16 are away from the front end 18A and rear end 18B of the truck 18 by a distance L. The distance L is determined on the basis of the stroke length of the piston-rod 12 for absorbing an impact energy and may be determined independently for the front and rear bumpers 16.

The invention contemplates to regulate this distance L in accordance with an anticipated magnitude of kinetic energy or impact force. The carriage mechanism 19 is employed to allow the buffer device 10 in its entirety to move relative to and longitudinally of the truck 18 frame so that the distance L may be adjusted to a most appropriate value. The carriage mechanism 19 per se may be chosen from various mechanisms commonly used to adjustably move a member within a limited distance, and may be operated either hydraulically, mechanically or electrically. For example, the buffer device 10 is mounted on the vehicle body by means of either a mechanical linkage or a guide rail and combined with an actuator of the hydraulic cylinder-piston type which is governed by an electrohydraulic servo valve, all of which are conventional and well known in the art.

Figure 3:
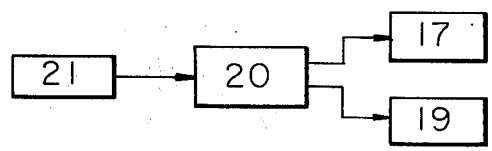
FIGS. 3 and 4 are block diagrams of first and second embodiments of a system of the invention, respectively.
Figure 5:
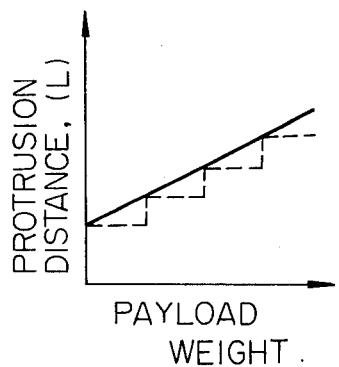
FIG. 5 is a graph showing qualitatively a regulated variation in the distance of a retracting bumper movement in a system of the invention with variation in the payload weight of a vehicle.
Figure 6:
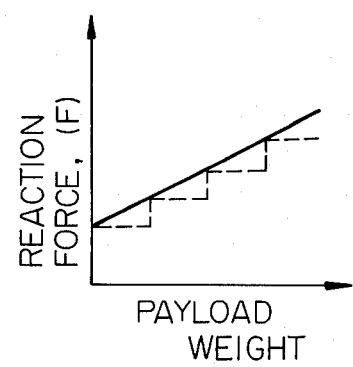
FIG. 6 is a graph similar to FIG. 5, but shows a regulated variation in the reaction force against the bumper movement.

In a system according to the invention, the energy absorption capacity of the buffer device 10 is varied by the action of either one of the pressure regulator 17 and the carriage mechanism 19 or both of them, and the action is initiated when the vehicle gross weight or payload weight varies. In the buffer device 10, a reaction force F on the piston-rod 12 or resistance against the inward movement thereof depends largely on the gas chamber 13 pressure. A representative block diagram of a first embodiment of a system of the invention is shown in FIG. 3. A control unit 20 receives a signal from a weight sensor 21 which senses the payload weight. In response to the signal, the control unit 20 operates the gas pressure regulator 17 and/or the carriage mechanism 19. The signal from the weight sensor 21, which may utilize a strain gage for example, is usually of an analog or continuous signal, but a digital or discontinuous signal may also serve the control unit 20, Irrespective of the signal mode from the weight sensor 21, the output mode of the control unit 20 and hence the variations in the protrusion distance L of the bumper 16 and/or the reaction force F can be regulated either linearly or step-wise as shown in FIGS. 5 and 6, wherein the solid lines and the broken lines represent the former and the latter cases, respectively. The control unit 20 which may include a comparator circuit and an amplifier circuit and has the above described function is well known in the field of automatic control.

There is no particular requirement for designing the control unit 20 for a system according to the invention. The pressure regulator 17 is typified by a common pressure-regulating valve.

Figure 7:
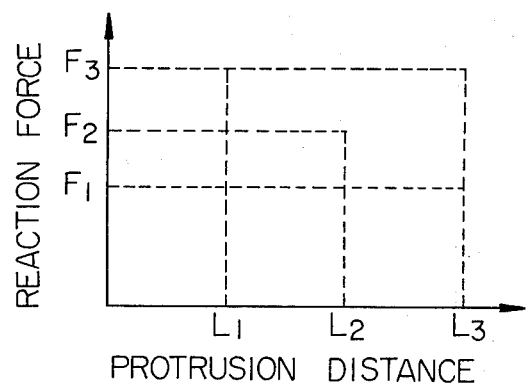
FIG. 7 is a graph for explanation of variations in the impact energy absorption capacity of a system of the invention.

The energy absorption capacity of the buffer device 10 can be determined in a wide range by various combinations of the protrusion distance L and the resistance F values since the magnitude of energy absorption in the buffer device 10 can be represented by F × L. In FIG. 7, $F_1$ and $L_1$ represent a resistance and a protrusion distance determined to give an energy absorption capacity appropriate to the unladen state. An increased capacity appropriate to a state of a certain payload weight can be established by either a combination of $F_3$ and $L_1$ or of $F_1$ and $L_2$. It will need no further explanation that the same capacity can be obtained also by varying both the F and L values together, and that an infinite number of combinations exist for a value of the absorption capacity.

Figure 4:
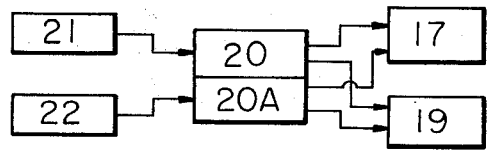

A system according to the invention may further include a vehicle speed sensor 22 in addition to the payload weight sensor 21 as shown in the block diagram of FIG. 4. As is frequently employed, a tachometer generator of conventional and known construction serves as the speed sensor 21 of convenience. A control unit 20A is added to perform the same operation as the unit 20 in response to a signal from the speed sensor. It will be easily understood that the two control units 20 and 20A can be combined into one control unit (no numeral) since major portions of the elements constituting the two units 20 and 20A are completely identical. The energy absorption capacity of the buffer device 10 can be more precisely regulated by the incorporation of the speed sensor 22, and the device 10 can act in its best faculty when it receives an impact practically under any vehicle condition. Consequently, a system of the invention makes an important contribution to the safety of passengers.

What is claimed is:

1. In combination with an automobile an impact energy absorption system comprising:
   a hydraulic shock absorber having a hydraulic cylinder, a piston-rod received in and protruding from said hydraulic cylinder, a pressurized gas chamber communicable with said hydraulic cylinder and a valve means for the control of fluid communication between said hydraulic cylinder and said pressurized gas chamber;
   a retractable bumper joined with said piston-rod;
   a weight detection means to sense the weight of a payload of the automobile and produce an electrical signal representing the sensed weight;
   a pressure regulation means for varying a gas pressure in said pressurized gas chamber;
   a carriage means for supporting said hydraulic cylinder in such a position that said bumper is located at a distance externally from an end of the automobile and selectively moving said hydraulic cylinder in the longitudinal direction of the automobile; and
   an electrical control means for controlling said pressure regulation means and said carriage means in response to said electrical signal, so that an energy absorption capacity in a collision of the automobile represented by the product of a resistance offered by said shock absorber against a retracting movement of said bumper and a distance travelled by said bumper until coming into contact with said end can be varied depending on said weight of said payload.

2. An impact energy absorption system according to claim 1, further comprising a speed detection means to sense the speed of the automobile and produce another electrical signal representing the sensed speed, and another electrical control means for controlling said pressure regulation means and said carriage means in response to said another electrical signal, so that said energy absorption capacity can be varied depending on both the weight of the payload and speed of the automobile.

* * * * *